US010282168B2

(12) United States Patent
Fazl Ersi et al.

(10) Patent No.: US 10,282,168 B2
(45) Date of Patent: May 7, 2019

(54) SYSTEM AND METHOD FOR CLUSTERING DATA

(71) Applicant: SLYCE CANADA INC., New Waterford (CA)

(72) Inventors: Ehsan Fazl Ersi, Toronto (CA); Bo Wang, Richmond Hill (CA); Maysum Panju, Richmond Hill (CA)

(73) Assignee: Slyce Canada Inc., New Waterford (CA)

( * ) Notice: Subject to any disclaimer, the term of this patent is extended or adjusted under 35 U.S.C. 154(b) by 544 days.

(21) Appl. No.: 15/058,506

(22) Filed: Mar. 2, 2016

(65) Prior Publication Data

US 2017/0024186 A1    Jan. 26, 2017

Related U.S. Application Data

(60) Provisional application No. 62/126,896, filed on Mar. 2, 2015.

(51) Int. Cl.
*G06F 17/30* (2006.01)
*G06F 7/20* (2006.01)
*G06K 9/62* (2006.01)

(52) U.S. Cl.
CPC .......... *G06F 7/20* (2013.01); *G06F 17/30539* (2013.01); *G06K 9/6218* (2013.01)

(58) Field of Classification Search
None
See application file for complete search history.

(56) References Cited

U.S. PATENT DOCUMENTS

| 6,421,668 | B1* | 7/2002 | Yakhini | G06F 17/30705 |
| 2014/0082024 | A1* | 3/2014 | Cao | G06F 17/30601 |
| | | | | 707/802 |
| 2015/0261846 | A1* | 9/2015 | Hall | G06F 17/30598 |
| | | | | 707/738 |
| 2016/0179923 | A1* | 6/2016 | Chehreghani | G06F 17/3071 |
| | | | | 707/637 |
| 2016/0232254 | A1* | 8/2016 | Chehreghani | G06F 17/10 |

* cited by examiner

*Primary Examiner* — Anhtai V Tran
(74) *Attorney, Agent, or Firm* — Pillsbury Winthrop Shaw Pittman LLP (57) ABSTRACT

A system for clustering data comprises a database for storing a plurality of data items, a clustering unit comprising components operable to receive and cluster the plurality of data items, and output clustered data items. A method of clustering data comprises receiving a plurality of data items from a database; computing distances between each pair of data items in the plurality of data items; until a stopping criterion is reached, identifying key elements, merging data items not identified as key elements with the nearest key elements, updating the computed distances; once the stopping criterion is reached, outputting cluster identities of the plurality of data items.

20 Claims, 9 Drawing Sheets

SYSTEM AND METHOD FOR CLUSTERING DATA

TECHNICAL FIELD

The following relates generally to systems and methods of data clustering.

BACKGROUND

The term "clustering" refers to the task of partitioning at least one collection of data items into different groups (referred to as "clusters"), such that the data items in each group might share certain properties or characteristics that may not exist among the data items in other groups.

The clusters resulting from clustering a collection of data items (referred to as a "dataset") should capture the natural structures present in the dataset, facilitating a better understanding of the data. Clustering is often challenging because datasets usually contain outliers and noise which can be difficult to identify and remove.

There are various applications for the clustered data resulting from clustering, such as image processing, pattern discovery and market research. The benefit of clustering over manual sorting can be a reduction in the labour and time that would otherwise be required to manually sort or label a dataset.

The term "distance" refers to the measurable degree of similarity between data items, such that data items having a small distance between one another have a high degree of similarity, and data items having a relatively larger distance between one another have relatively less similarity.

A good clustering solution should provide robustness to both intra- and inter-class variations. That is, items which belong to known classes should have small distances between one another and therefore be grouped in similar clusters, and items in different known classes should have larger distances between one another and as a result fall into different clusters.

One type of cluster analysis is called "connectivity-based clustering". According to some methods of connectivity-based clustering, clustering is achieved by taking as inputs pairwise distances between data items, and then clustering data generally according to the principle that items having low distance between one another (i.e. high similarity) tend to be clustered together. One example of this type of clustering is referred to as "hierarchical clustering", wherein different clusters are formed at various levels of distance values, resulting in a dendrogram representation of data.

Another clustering method is called "affinity propagation", wherein message-passing inference is performed on pairwise distance inputs. It is capable of selecting representative items from a dataset and automatically determining the optimal number of clusters.

Other clustering methods include centroid-based (e.g., K-means), distribution-based (e.g., Gaussian Mixture Models) and graph-based (e.g., Spectral Clustering) methods.

SUMMARY

In one aspect, a computer-implemented method for generating a key element vector identifying key elements for clustering a dataset is provided, the method comprising: obtaining the dataset, the dataset comprising a plurality of data items for which a distance determination can be made; defining a stopping criterion; generating a similarity matrix representing the pairwise distances of the data items; identifying, by a processor, a first key element for the key element vector by selecting the data item having a minimum average distance to each of the remaining data items; and iteratively, until the stopping criterion is met, selecting additional key elements for the key element vector from among the remaining data items based upon determining which of the remaining data items has the maximum minimal distance to the existing key elements.

In another aspect, a system for generating a key element vector identifying key elements for clustering a dataset is provided, the system comprising: a database storing a dataset comprising a plurality of data items for which a distance determination can be made; a clustering unit communicatively linked to the database, the clustering unit having a processor, and the clustering unit configured to: obtain the dataset from the database; define a stopping criterion; generate a similarity matrix representing the pairwise distances of the data items; identify a first key element for the key element vector by selecting the data item having a minimum average distance to each of the remaining data items; and iteratively, until the stopping criterion is met, select additional key elements for the key element vector from among the remaining data items based upon determining which of the remaining data items has the maximum minimal distance to the existing key elements.

These and other aspects are contemplated and described herein. It will be appreciated that the foregoing summary sets out representative aspects of systems and methods for clustering data to assist skilled readers in understanding the following detailed description.

DESCRIPTION OF THE DRAWINGS

A greater understanding of the embodiments will be had with reference to the Figures, in which.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein. Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors. Further, any computer storage media and/or processors may be provided on a single application-specific integrated circuit, separate integrated circuits, or other circuits configured for executing instructions and providing functionality as described below.

Clustering can be used, in an example application, to reduce the labour involved and/or increase the accuracy in sorting items of a data set. In a particular application, a method of clustering may facilitate the sorting of a large set of data items into discrete clusters, such as when processing a new database of products images or faces. More specifically, one example application is the use of clustering to recognize and cluster similar products from a database of products, which may be useful for product recommendation or retrieval systems. A further example is the use of clustering to recognize and cluster similar faces from a database of faces.

The following provides, in one aspect, a system for clustering data, the system comprising, a database for storing a plurality of data items, a clustering module comprising components operable to receive and cluster the plurality of data items, and output clustered data items.

In another aspect, a method of clustering data is provided, the method comprising: receiving a plurality of data items from a database; computing distances between each pair of data items; iteratively, until a stopping criterion is reached: identifying key elements from the data items, merging data items not identified as key elements with the nearest key elements to form clusters, re-computing distances; and, once the stopping criterion is reached, outputting the labels of the plurality of data items.

In a further aspect, a key element selection process for identifying a specified number of key elements in a dataset is provided. The key elements selected from the data items may be used for merging, such that during clustering, data items that are not selected as key elements are later merged with their proximal key element. The key element selection process may comprise: receiving a dataset, distances for data items in the dataset and a stopping criterion, such as a desired number of clusters for the present iteration of the clustering method (or another stopping criterion); identifying a first key element as the data item having a minimum average distance to the other data items; iteratively identifying additional key elements by identifying a data item (or cluster) having the maximum minimal distance to previously identified key elements until the stopping criterion is met (e.g. according to at least one embodiment, once the process has identified as many key elements as the desired number of clusters); returning the identity of the data items corresponding to the identified key elements.

In some embodiments, the stopping criterion, such as the desired number of key elements in the key element selection process, may be reduced for each successive iteration of the method of clustering data such that the clustering target in the method of clustering data will eventually be reached when the desired number of key elements for the key element selection process falls below or equals a particular value, as defined by the stopping criterion.

Figure 1:
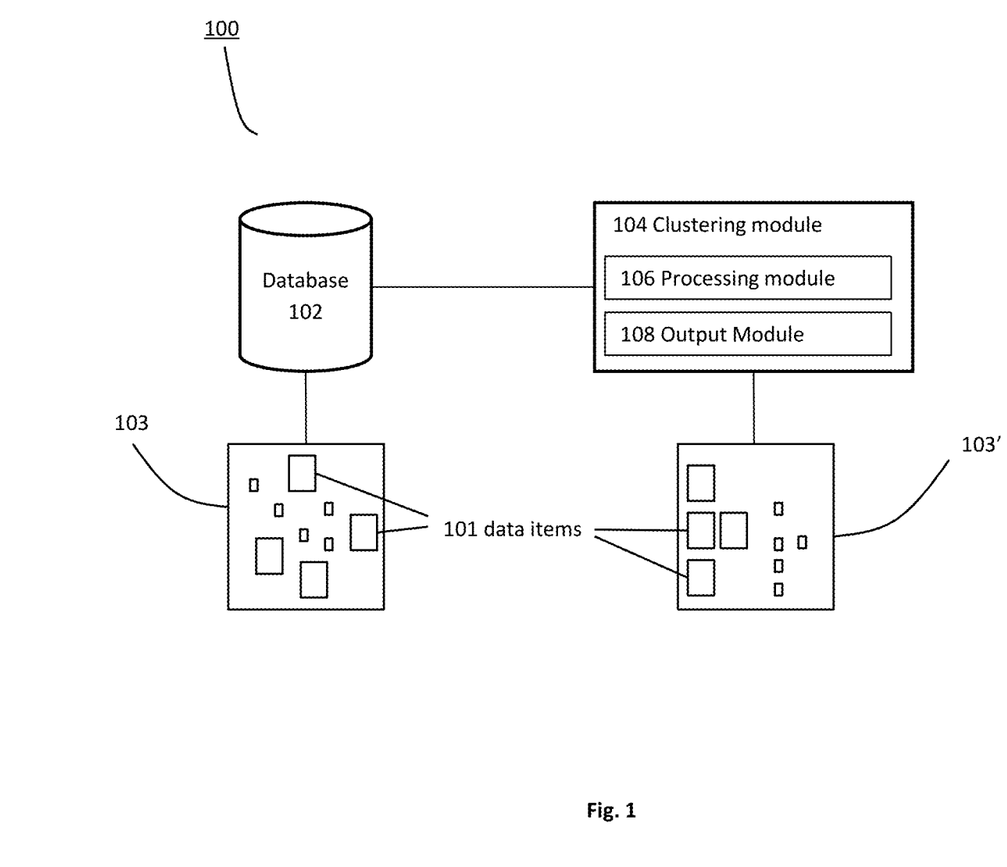
FIG. 1 is a block diagram representation of a system of clustering data.

Referring now to FIG. 1, an embodiment of a system for clustering data (100) is shown. The illustrated system (100) comprises a database (102) communicatively linked with clustering unit (104). Database (102) comprises a dataset (103) comprising a plurality of data items (101). Clustering unit (104) comprises processing unit (106) (such as a processor), and may comprise or be linked to an output unit (108). In some embodiments output unit (108) may be in communication with an external computing device (not shown). In various embodiments clustering unit (104) comprises or is linked to a user interface unit (not shown) for facilitating user control of clustering tasks by clustering unit (104). For example, a user interface unit may be operable to engage clustering, stop clustering and receive or review outputs from clustering unit (104).

In various embodiments, clustering unit (104) is operable to access database (102), retrieve dataset (103) and output a clustered dataset (103'). In various embodiments, processing unit (106) is operable to cluster data items (101) belonging to dataset (103) into clusters. In some embodiments, output unit (108) may be operable to output clustered dataset (103') for use in various applications for clustered data, as described above.

In some embodiments, clustered dataset (103') comprises data items (101) from dataset (103) labeled by processing unit (106), wherein the labels indicate, for each data item or for groups of data items, a designated cluster. The use of labels may facilitate later sorting of dataset (103') into distinct clusters for use in some applications. In some embodiments, output unit (108) is operable to sort clustered dataset (103'), such that data items from dataset (103) are sorted into distinct clusters.

Figure 2:
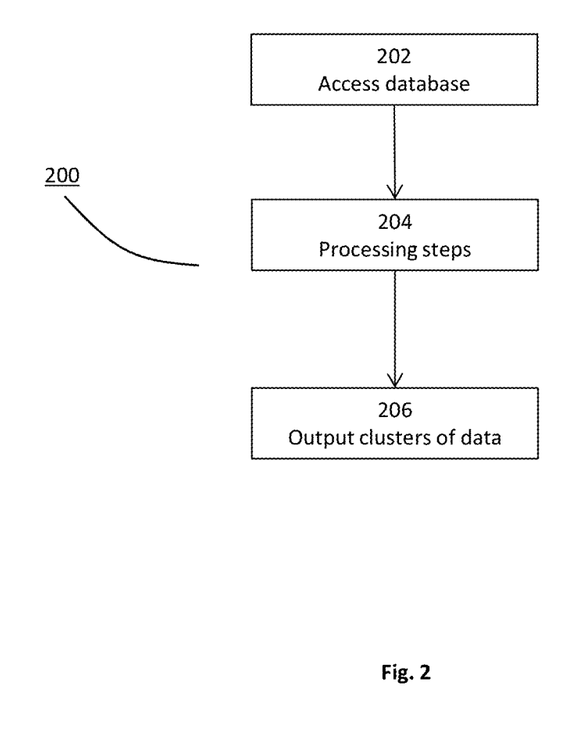
FIG. 2 is a flowchart representation of a method of clustering data.

Referring now to FIG. 2, an exemplary method of clustering data (200) is shown. At block (200), clustering unit (104) accesses database (102) to retrieve a dataset (103). At block (200), processing unit (106) receives the dataset (103) and processes the dataset (103) to cluster the data. At block (206), the output unit (108) may be operable to sort and/or output the clustered data (103') for use in applications for clustered data, as described above. Each block of the method (200) will be described in more detail below.

Figure 3A:
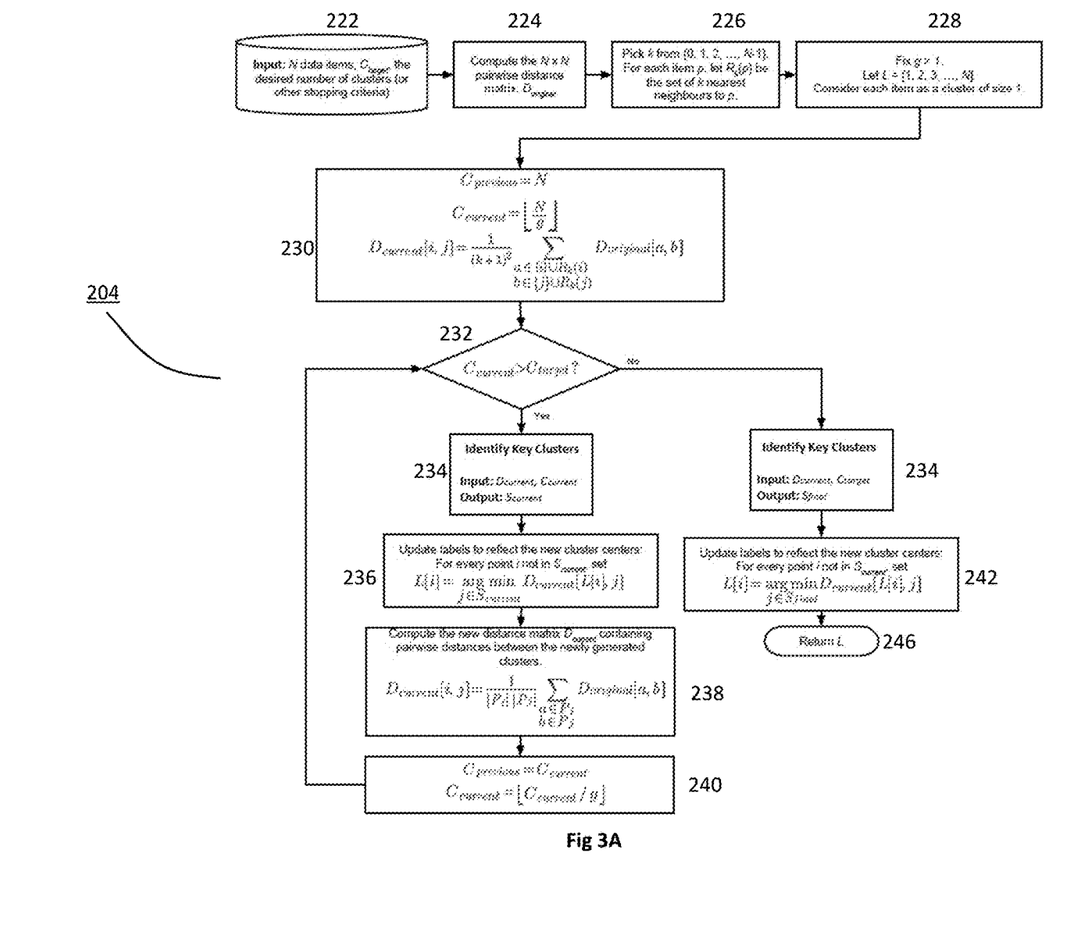
FIG. 3A is a flowchart representation of the processing steps of a method of clustering data.

Referring now to FIG. 3A, the processing blocks (204) of an embodiment of a method of clustering data (200) are shown, wherein each processing block illustrates a step performed and/or a data input received by processing unit (106), such that processing unit (106) is operable to cluster data received from database (202).

As illustrated, at block (222) an input of a dataset of items to be clustered is provided, comprising N data items. Further, at block (222) a clustering target is also provided, wherein the clustering target defines a certain condition the occurrence of which signals the clustering method to terminate. The clustering target may, for example, be a desired number of clusters to be output by the method (i.e. a target number of clusters), a distance threshold, or other definable criterion, such that the clustering terminates once the criterion is met. In some embodiments a clustering target comprises a combination of criteria, such as a desired number of clusters, and also a desired number of iterations, such that the method terminates once either criterion is met. For the sake of brevity, in the following passages, the desired number of clusters to be achieved by the clustering method is described to be the clustering target, although another clustering target may be used. The desired number of clusters for the method will hereinafter be referred to as $C_{target}$.

The dataset (103) for clustering is a list of data items (101) accessed from database (102) that defines the data objects to be clustered, where an object is anything that can be represented using a consistent format such that distances between objects can be computed. As provided above, the number of items in the dataset will hereinafter be referred to as N.

At block (224), $D_{original}$, an N×N distance matrix computed for the dataset, is generated. The distance matrix for a list of m items may be a real, symmetric m×m matrix, in which the entry in the i-th row and j-th column of the matrix is the distance between the i-th and j-th items in the list, that is:

$$D_{original}[i,j] = \text{dist}(i,j) \quad (1)$$

where, dist is a distance function that returns computed distances between pairs of items in the provided dataset.

It will be understood that the distance matrix has relevance where the items belong to a space on which distances are meaningfully defined. If the items in the dataset can be represented as elements in a finite-dimensional vector space, such as points on a standard two-dimensional plane, then the notion of Euclidean distance may be sufficient. In the case of other representations, which may be more complicated, other distance functions can be used. For example, for some input representations, a distance based on cosine function may be a good option, while for some other representations, the Hamming distance may be appropriate.

In some embodiments, $D_{original}$ may be generated by computing the distance between every pair of items in the dataset, and updating the corresponding entries of the distance matrix with those values. Depending on the nature of the dataset and of the distance function, it will be understood that other implementations may also be operable and/or desirable.

Given $D_{original}$, block (226) comprises identifying, for each item i in the dataset, the set $R_k(i)$ of k nearest neighbouring items, where k is a constant parameter of the clustering method, and may thus be, in at least some embodiments, any natural number from 0 to N−1. The set $R_k(i)$ for an item i in the dataset is the k items in the dataset, aside from i, whose distances from i are minimal. These neighbours may be identified using the values in the distance matrix, $D_{original}$.

Referring now to block (228), a parameter L may be defined as a list of N numbers that are treated as labels for each of the N items in the dataset, identifying a cluster label for each item. In some embodiments, initially, L=[1,2, 3, . . . , N], representing that the clustering method begins by treating each item in the dataset as a distinct cluster containing a single item. As the clustering method proceeds through the processing blocks (204), smaller clusters will be merged to form larger ones (as described in more detail below), and label values L will be updated accordingly. Thus, although the total number of entries in the list L will remain equal to N, the number of unique entries in the list corresponds to the current number of clusters, and, in general, is non-increasing as the clustering method proceeds.

Again referring to block (228), a parameter g may be introduced and defined as the number of iterations required to obtain the output result clusters. The selection of g affects the clustering method's accuracy and time complexity. In the illustrated embodiment, the value of g may be any real number larger than 1.0. In various embodiments, the parameter g may be varied to alter how the clustering method's accuracy and time complexity is thereby affected. In some embodiments, g may be selected such that g is smaller than N divided by $C_{target}$, but greater than 1.0. In some embodiments, g may be selected such that g is greater than or equal to N divided by $C_{target}$.

Referring now more generally to method (200) the clustering method (200) takes as input a dataset, a clustering target, such as $C_{target}$, and a process for identifying and returning key elements in a dataset, such as the method described in relation to block (234) discussed in more detail below. The clustering method (200) begins with processing of data in processing blocks (204) by treating the dataset as a collection of N clusters, wherein each cluster contains a single item. The processing according to blocks (204) proceeds by iteratively merging clusters of items together. These merges happen iteratively, so that it may take multiple rounds of merging before there are exactly $C_{target}$ clusters remaining. Within each iteration, $C_{previous}$ represents the number of clusters at the start of that iteration, and $C_{current}$ is the desired number of clusters sought by the end of that iteration.

The above parameters may be initialized at the first iteration at block (230) as follows:

$$C_{previous} = N, \; C_{current} = \left\lfloor \frac{N}{g} \right\rfloor \quad (2)$$

Both the number of clusters and the distances between the clusters may change as the clustering method proceeds. According to an embodiment, distance matrix, $D_{current}$, maintains the distances between the current clusters throughout the clustering method, which can be initialized as follows:

$$D_{current}[i, j] = \frac{1}{(k+1)^2} \sum_{\substack{a \in \{i\} \cup R_k(i) \\ b \in \{j\} \cup R_k(j)}} D_{original}[a, b] \quad (3)$$

where, $R_k(i)$ and $R_k(j)$ refer to the sets of neighbouring items, each of size k, as identified above in relation to block (226).

As illustrated at block (232), in carrying out the processing according to processing blocks (204) of method (200), the blocks (232), (234), (236), (238) and (240) are repeated iteratively as long as $C_{current} > C_{target}$.

According to some embodiments, the repeated iteration of steps (232), (234), (236), (238), (240) will occur where g is selected such that g is smaller than N divided by $C_{target}$, but greater than 1.0. In embodiments where g is selected to be greater than or equal to N divided by $C_{target}$, the method may skip the iterative process (as at step (232) $C_{current} \le C_{target}$), to proceed to step (234) with inputs $D_{current}$, $C_{target}$ and proceed to steps (242), (246) (as described below).

If $C_{current} > C_{target}$, at block (234) the clustering method (200) first proceeds by identifying key elements. A key element selection process (described below) is applied to the distance matrix $D_{current}$, to identify $C_{current}$ key elements, which are then stored in the set $S_{current}$. As described below, the key element selection process may proceed iteratively until $C_{current}$ key elements are identified, or may proceed until another stopping criterion is reached.

Next, at block (236), clustering labels are updated. Any existing element (whether a single data item or an intermediate cluster of data items) that was not selected as a key element is merged with the key element that is closest to it, which may be identified using the distances from the current distance matrix, $D_{current}$. The merge may take place by updating the cluster labels in L for items that are part of the merging cluster. More specifically, for every data item i that is not part of a selected cluster (i.e. $L[i] \notin S_{current}$), the following update is performed:

$$L[i] = \arg\min_{j \in S_{current}} D_{current}[L[i], j] \quad (4)$$

When necessary, clusters may be relabelled so that L comes from the set $\{1,2,3, \ldots, C_{current}\}$.

Next, at block (238) the distance matrix is updated. The distance matrix $D_{current}$ may be updated to store the distances between the new $C_{current}$ clusters as a result of the merging actions that occurred in the previous block. Let $P_i$ represent the set which consists of all items in the dataset that are members of the cluster $L[i]$, along with all their neighbours, that is, $$P_i = \{y: L[y]=i\} \cup (\cup_{j \in \{y: L[y]=i\}} R_k(j)) \quad (5)$$

The entry at row i and column j of the updated $C_{current} \times C_{current}$ distance matrix may then be computed as follows to provide pairwise distances between the newly generated clusters:

$$D_{current}[i, j] = \frac{1}{|P_i||P_j|} \sum_{\substack{a \in P_i \\ b \in P_j}} D_{original}[a, b] \quad (6)$$

Finally, block (240) provides updating the values of $C_{previous}$ and $C_{current}$ as follows:

$$C_{previous} = C_{current}, C_{current} = \left\lfloor \frac{C_{current}}{g} \right\rfloor \quad (7)$$

Accordingly, the steps described in relation to blocks (232), (234), (236), (238), (240) are performed iteratively, until $C_{current} \le C_{target}$.

If at block (232) the value of $C_{current}$ in the last iteration—i.e. once $C_{current} \le C_{target}$—is not equal to $C_{target}$, the steps described in relation to blocks (234), (242) and (246) are performed for $C_{current} = C_{target}$, resulting in a final output of L at block (242). Block (242) is analogous to block (236), but the output L is the final cluster array.

The cluster array L, providing a cluster label for each item, can then be output to the output unit (108) and may then be output therefrom for various applications for clustered data as described above. In some embodiments, the output unit (108), upon receiving the cluster array L, sorts the dataset according to the clusters dictated by labels in L, and may then output the sorted data. In some embodiments the clustered dataset (103') is output to a computing device, optionally to be displayed on a user interface for review by a user.

Figure 3B:
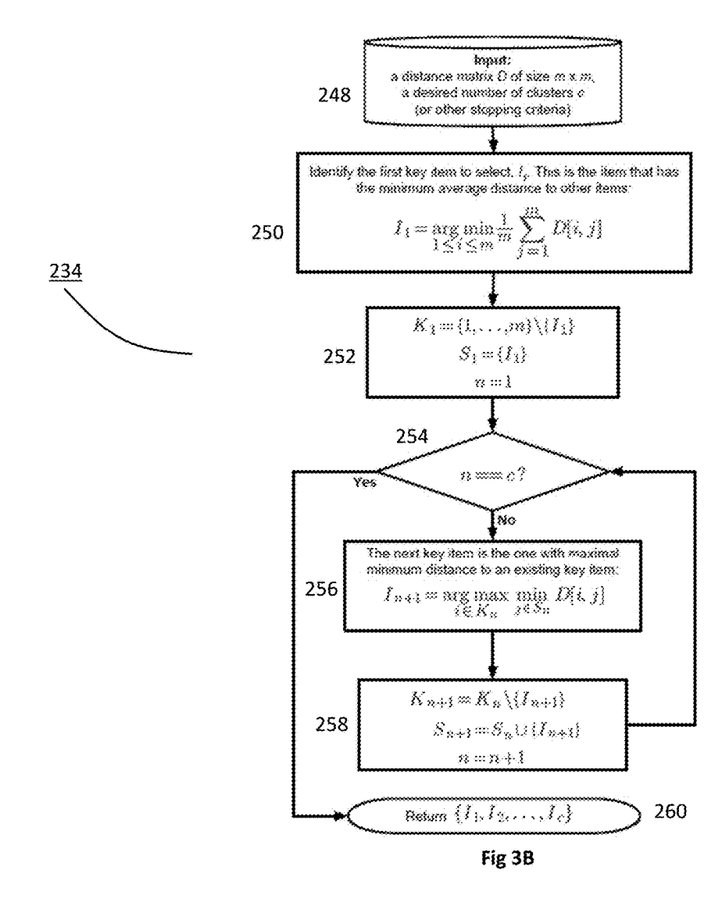
FIG. 3B is a flowchart representation of a key element selection process according to a method of clustering data.

Referring now to FIG. 3B, block (234) illustrates an exemplary key element selection process for identifying a specified number of key elements in the dataset, where an element can be a data item or an intermediate cluster of data items (i.e. a cluster that comprises more than one data item).

Block (248) illustrates that the key element selection process may receive as inputs a distance matrix D of size m×m, storing pairwise distances between m elements in a dataset, and a stopping criterion c, such as a desired number of key elements $C_{current}$.

According to some embodiments, the output of the key element selection process may be a set of c integers, wherein the integers respectively correspond to indices of elements that are identified as key elements.

At block (250), the key element selection process may commence by identifying the element $I_1$ that has, on average, the shortest distance to every other element in the dataset, as follows:

$$I_1 = \arg\min_{1 \le i \le m} \frac{1}{m} \sum_{j=1}^{m} D[i, j] \quad (8)$$

Referring now to block (252), $S_n$ may comprise the set of elements already selected and $K_n$ may comprise the set of elements not yet selected, at the beginning of a given iteration n of the key element selection process (234).

Referring now to blocks (254), (256) and (258), the key element selection process iteratively searches for the next key element, $I_{n+1}$, that has the maximum minimal distance to the elements identified at blocks (250) and (258) (i.e. the already-selected elements $S_n$):

$$I_{n+1} = \arg\max_{i \in K_n} \min_{j \in S_n} D[i, j] \quad (9)$$

Accordingly, the maximum minimal distance to already-identified key elements provides a least similar remaining element; that is, a good candidate to be selected as a next key element. This is because a candidate element that has a large distance to its nearest identified key element is, by definition, relatively distant from all key elements.

The key element selection process may then end at block (260) after a stopping criterion is reached. In some embodiments, the key element selection process may end at block (260) after one or more stopping criterion is reached. These stopping criteria may comprise any of the following: the number of selected key elements reaches a stopping criterion c, such as the selected key elements are returned, a desired number of selected key elements is attained, and a distance threshold for equation 9 is reached. The stopping criteria could comprise another criterion than is provided in the example above and described by g.

Figure 4A:
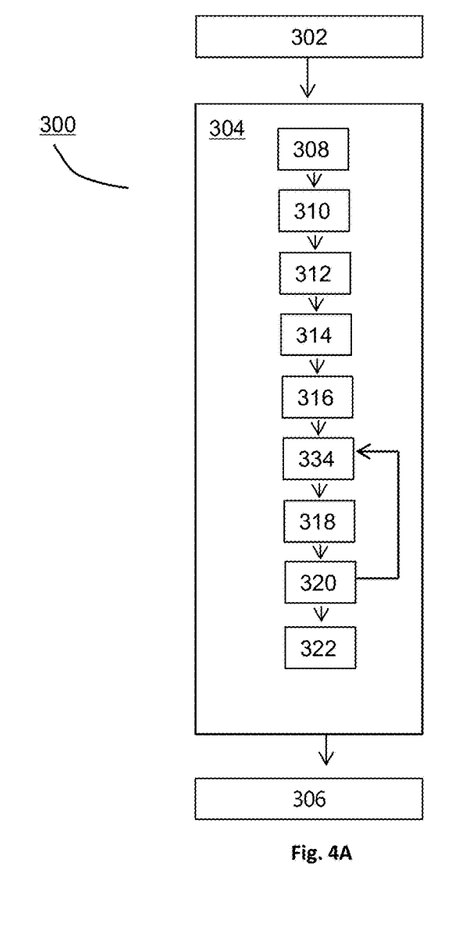
FIG. 4A is flowchart representation of the processing steps of a method of clustering data.
Figure 4B:
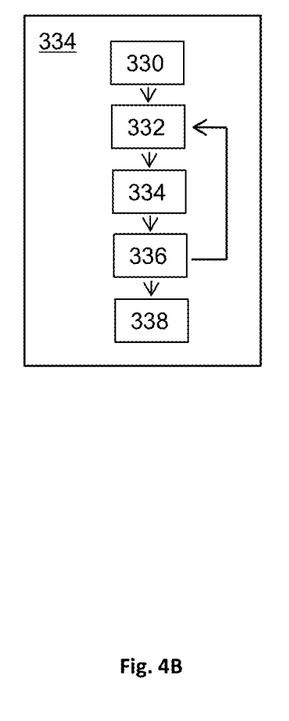
FIG. 4B is a flowchart representation of a key element selection process according to a method of clustering data.

Referring now to FIGS. 4A-4B, shown therein are simplified flowcharts of the clustering method (200) described in more detail above. Illustrated in FIG. 4A, element (300) is analogous to the clustering method (200) and processing blocks (304) are analogous to processing blocks (204). Illustrated in FIG. 4B, blocks (334) are analogous to the key element selection process (234).

Referring now specifically to FIG. 4A, clustering method (300) commences at block (302) by accessing a database and receiving therefrom a dataset comprising data items to be clustered. Processing blocks (304), performed by a processing unit, proceed at block (308) by receiving as input data items to be clustered and a clustering target, wherein the clustering target defines a condition that—when met—will terminate the clustering method. In at least some embodiments, the clustering target comprises a desired number of data clusters. At block (310), the method comprises generating a distance matrix wherein the distance matrix comprises pairwise distance measurements of the data items to be clustered. At block (312), the method may comprise identifying the nearest neighbouring items for each data item using values stored in the distance matrix. At block (314) cluster identities may be generated for each data item, such that each data item has an associated unique cluster identity. Further, a g parameter may be introduced to alter the number of iterations required to reach a given number of clusters and vary the method's accuracy and time complexity. At block (334), the method comprises identifying and returning the identities of key elements for the dataset. At block (316), data items that are not picked as key elements are merged with their respective closest key element, identified using values stored in the distance matrix. This merging generates new clusters and may necessitate updating cluster identity labels. At block (318), a new distance matrix is computed, given the newly generated clusters. Block (320) indicates to iterate the steps performed in relation to blocks (334), (318), (320) while the total number of clusters is greater than the desired number of clusters, though other clustering targets can be used. Block (322) indicates to return from the processing unit the cluster identity of each data item, for example by outputting an array comprising the updated cluster identities. At block (306), a clustered dataset can be output. At least in some embodiments the clustered dataset will be sorted into clusters by an output unit in conjunction with the output of the processing unit before being output. In some embodiments, the clusters comprise sorted images of faces and/or sorted images of products, such that each cluster only includes face images belonging to the same individual, or only include product images of the same product.

Referring now to FIG. 4B, shown therein is an exemplary key element selection process (334) for identifying a specified number of key elements in the dataset. The process (234) commences at block (330) by receiving as input a distance matrix and a stopping criterion, such as a desired number of key elements. Where the stopping criterion is a desired number of key elements, the stopping criterion may vary for each iteration of the clustering method (300)—such as by being varied to decline at each successive iteration by the parameter g. At block (332) the process continues by identifying a first key element being the data item having the shortest average distance to every other item (or cluster) in the dataset. The process continues at block (334) by identifying a key element that has the maximal minimum distance to any element(s) so far identified as key elements. At block (336), the process checks whether the desired number of key elements has been met, and then proceeds to iteratively repeat steps (332) and (334) until the stopping criterion is met, such as when the desired number of key elements have been identified. Once the desired number of key elements has been reached, the process proceeds at block (338) to return the identities of any identified key elements.

To verify the effectiveness of the method (200), tests could be conducted on different datasets. To put the results in context, the accuracy of the method could be compared to commonly used clustering techniques, such as, K-means Average Hierarchical Clustering, and Affinity Propagation (See Longin J. Latecki, Rolf Lakamper and Ulrich Eckhardt (2000) "Shape descriptors for non-rigid shapes with a single closed contour", Proceedings of IEEE Conference on Computer Vision and Pattern Recognition).

It may be found that the method (200) outperforms the alternative clustering techniques on some datasets.

A dataset comprising synthetic 2-D data points generating a logo, for example, could be used where the objective could be to cluster the data points so that each group is representative of a distinctive character of the logo. Further, rather than using the Euclidian distance measure, a distance measure could be used that would take into account manifold information, as in Bo Wang, et al. "Similarity network fusion for aggregating data types on a genomic scale" (2014), Nature Methods, (11) 3, pp. 333-337.

Figure 5A:
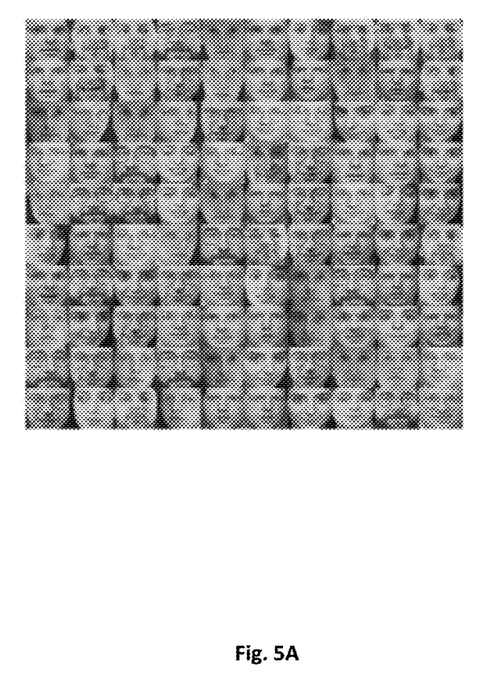
FIG. 5A illustrates a random subset of the ORL dataset which could be used for testing methods of clustering.
Figure 5B:
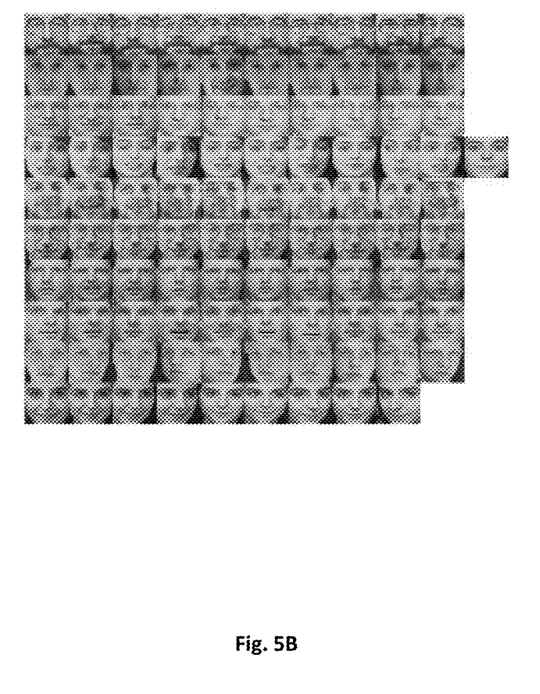
FIG. 5B illustrates possible results of clustering a subset of the ORL dataset that might be achieved according to methods of clustering; and, FIG. 6 illustrates sample shapes from the MPEG-7 dataset that could be used for testing methods of clustering.

There are also popular publicly available benchmark datasets, such as, the ORL Database of Faces, which consists of 400 face images belonging to 40 different individuals (See e.g. Ferdinando S. Samaria and Andy C. Harter (1994) "Parameterisation of a stochastic model for human face identification", Proceedings of the Second IEEE Workshop on Applications of Computer Vision). The goal of a test could be to cluster the data items (i.e. face images) into a certain number of clusters, such that each cluster only includes face images that belong to one individual. The results might be as illustrated in FIG. 5B as compared to a random sampling of the ORL Database as illustrated in FIG. 5A. Pixel intensities could be used as a representation of images and Principal Component Analysis (PCA) could be applied to reduce dimensionality, e.g. to 100. The Euclidean distance measure could then be used to compute the pairwise distances between every two faces. To evaluate the quality of various clustering results, a commonly used metric called Normalized Mutual Information (NMI) could be used (See Frederik Maes, et al. (1997) "Multimodality image registration by maximization of mutual information", IEEE Transactions on Medical Imaging, (16) 2 pp. 187-198). Given a dataset of Nitems, the resulting clustering labels L (with P clusters), and the groundtruth clustering labels Y (with Q clusters), the Normalized Mutual Information metric could be computed as follows:

$$NMI(L, Y) = \frac{I(L, Y)}{(H(L) + H(Y))/2} \quad (10)$$

where, I is the mutual information, computed as follows:

$$I(L, Y) = \sum_{p=1}^{P} \sum_{q=1}^{Q} \frac{|L_p \cap Y_q|}{N} \log \frac{|L_p \cap Y_q|}{|L_p|/N \times |Y_q|/N} \quad (11)$$

and, H is the entropy, computed for L and Y as follows:

$$H(L) = -\sum_{p=1}^{P} \frac{|L_p|}{N} \log \frac{|L_p|}{N} \quad (12)$$

$$H(Y) = -\sum_{q=1}^{Q} \frac{|Y_q|}{N} \log \frac{|Y_q|}{N} \quad (13)$$

where the highest possible value for NMI is one, and where a score of 1 would indicate that the obtained clustering was the same as the groundtruth clustering.

Figure 6:
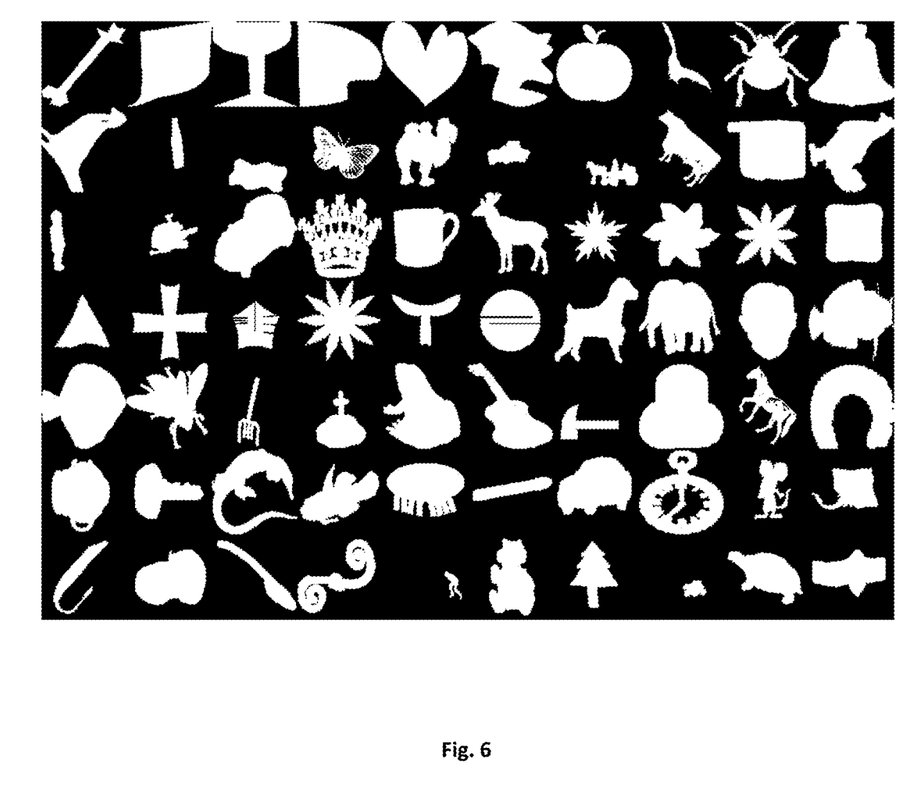

Further, the publicly available dataset MPEG7 comprising 1400 binary shape images could be used, as shown in FIG. 6 (See Brendan J. Frey and Delbert Dueck (2007) "Clustering by passing messages between data points", *Science Magazine,* (315) 5814 pp. 972-976). The goal could be to cluster the data items into a certain number of clusters, so that each cluster only includes shapes that belong to one class. Different shape matching algorithms could be used to produce the distance matrix, such as the Shape Contexts (SC) (See Serge Belongie, Jitendra Malik and Jan Puzicha (2002) "Shape matching and object recognition using shape contexts", IEEE Transactions on Pattern Analysis and Machine Intelligence, (24) 4, pp. 509-522), and the Inner Distance (IDSC) (See Haibin Ling and David W. Jacobs (2007) "Shape classification using the inner-distance", IEEE Transactions on Pattern Analysis and Machine Intelligence, (29) 2 pp. 286-299). Further, manifold information could be incorporated in the computation of distance measures.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method for generating a key element vector identifying key elements for clustering a dataset, the method comprising:
   a. obtaining the dataset, the dataset comprising a plurality of data items for which a distance determination can be made;
   b. defining a stopping criterion;
   c. generating a similarity matrix representing the pairwise distances of the data items;
   d. identifying, by a processor, a first key element for the key element vector by selecting the data item having a minimum average distance to each of the remaining data items; and
   e. iteratively, until the stopping criterion is met, selecting additional key elements for the key element vector from among the remaining data items based upon determining which of the remaining data items has the maximum minimal distance to the existing key elements.

2. The method of claim 1, further comprising defining clusters of data items surrounding the selected key elements.

3. The method of claim 2, further comprising iteratively defining the clusters, wherein for each iteration, the method defines additional clusters of data items surrounding the selected key elements, generates an additional similarity matrix representing pairwise distances between the defined clusters, identifies a further set of key elements and redefines the clusters until a clustering target is met.

4. The method of claim 3, wherein the stopping criterion is a desired number of clusters for each iteration.

5. The method of claim 4, further comprising reducing the stopping criterion at each subsequent iteration by a parameter.

6. The method of claim 3, wherein the clustering target is a desired number clusters for the dataset.

7. The method of claim 5, wherein reducing the stopping criterion at each subsequent iteration comprises dividing the stopping criterion by the parameter at each iteration, said parameter being greater than 1 but less than the number of data items in the dataset.

8. The method of claim 3, wherein defining clusters of data items surrounding the key elements comprises merging each key element with its closest data items according to the pairwise distances in the similarity matrix.

9. The method of claim 3, wherein defining clusters at each iteration comprises labeling each data item with a label according to its defined cluster, and wherein the method further comprises, upon the clustering target being met, outputting the labels for clustering data for use in subsequent sorting of the dataset.

10. The method of claim 1, wherein the pairwise distances comprise Euclidean distances between data items.

11. A system for generating a key element vector identifying key elements for clustering a dataset, the system comprising:
   a. a database storing a dataset comprising a plurality of data items for which a distance determination can be made;
   b. a clustering unit communicatively linked to the database, the clustering unit having a processor, and the clustering unit configured to:
      i. obtain the dataset from the database;
      ii. define a stopping criterion;
      iii. generate a similarity matrix representing the pairwise distances of the data items;
      iv. identify a first key element for the key element vector by selecting the data item having a minimum average distance to each of the remaining data items; and
      v. iteratively, until the stopping criterion is met, select additional key elements for the key element vector from among the remaining data items based upon determining which of the remaining data items has the maximum minimal distance to the existing key elements.

12. The system of claim 11, wherein the clustering unit is further configured to define clusters of data items surrounding the selected key elements.

13. The system of claim 12, wherein the clustering unit is further configured to iteratively define the clusters, wherein for each iteration, the clustering unit defines additional clusters of data items surrounding the selected key elements, generates an additional similarity matrix representing pairwise distances between the defined clusters, identifies a further set of key elements and redefines the clusters until a clustering target is met.

14. The system of claim 13, wherein the stopping criterion is a desired number of clusters for each iteration.

15. The system of claim 14, wherein the clustering unit is further configured to reduce the stopping criterion at each subsequent iteration by a parameter.

16. The system of claim 13, wherein the clustering target is a desired number clusters for the dataset.

17. The system of claim 15, wherein reducing the stopping criterion at each subsequent iteration comprises dividing the stopping criterion by the parameter at each iteration, said parameter being greater than 1 but less than the number of data items in the dataset.

18. The system of claim 13, wherein defining clusters of data items surrounding the key elements comprises merging each key element with its closest data items according to the pairwise distances in the similarity matrix.

19. The system of claim 13, wherein defining clusters at each iteration comprises labeling each data item with a label according to its defined cluster, and wherein the clustering unit is further configured to, upon the clustering target being met, output the labels for clustering data for use in subsequent sorting of the dataset.

20. The system of claim 11, wherein the pairwise distances comprise Euclidean distances between data items.

* * * * *